(No Model.)
F. C. WATSON.
MUSIC LEAF HOLDER.
No. 439,987. Patented Nov. 4, 1890.
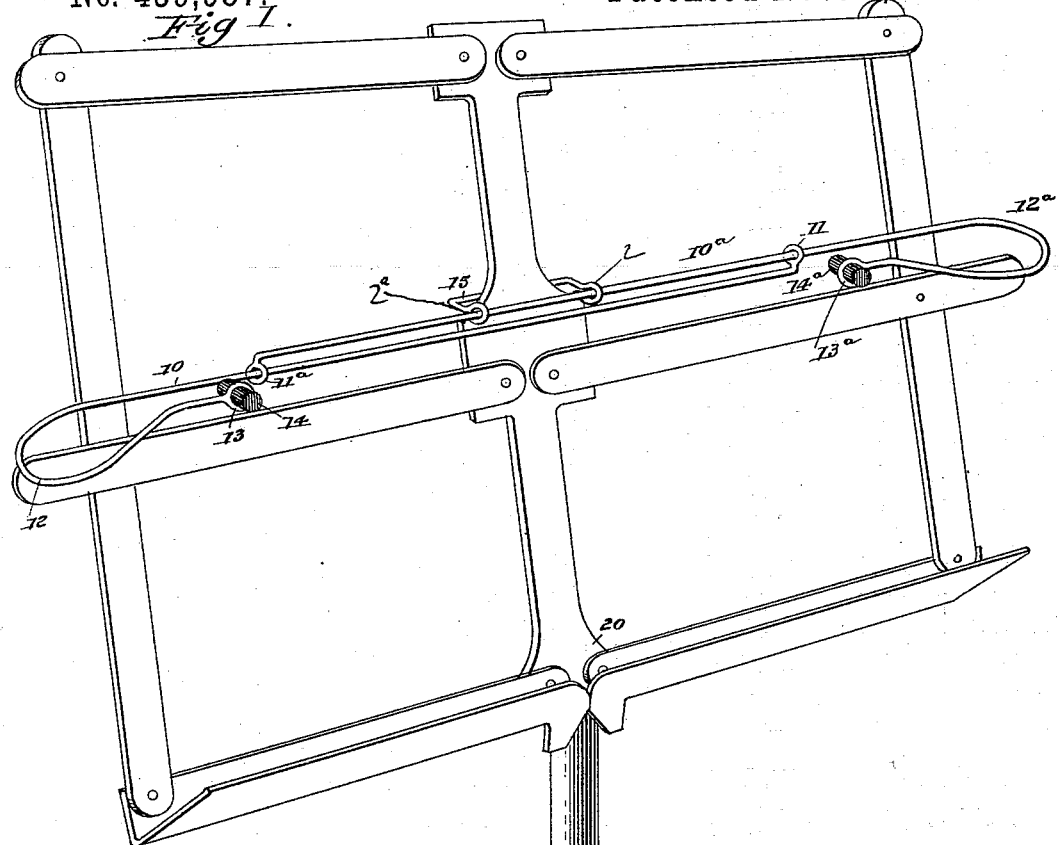
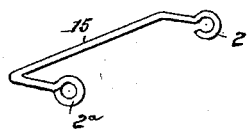
WITNESSES:
J. H. Clark.
C. Sedgwick.
INVENTOR:
F. C. Watson
BY Munn & Co.
ATTORNEYS.

UNITED STATES PATENT OFFICE.

FREDERICK C. WATSON, OF GLOUCESTER, MASSACHUSETTS.

MUSIC-LEAF HOLDER.

SPECIFICATION forming part of Letters Patent No. 439,987, dated November 4, 1890.

Application filed March 27, 1890. Serial No. 345,487. (No model.)

*To all whom it may concern:*

Be it known that I, FREDERICK C. WATSON, of Gloucester, in the county of Essex and State of Massachusetts, have invented a new and Improved Music-Leaf Turner, of which the following is a full, clear, and exact description.

This invention relates to music-leaf holders, the object of the invention being to provide a holder which may be readily connected with almost any form of music-stand, and which when so connected may be adjusted so as to hold the leaves of a music-book or of sheet-music, irrespective of the size of said leaves, the invention consisting, essentially, of two adjustably-connected arms and a retaining-loop carried by one of said arms, the adjustable arms being bent over and provided with rubber bearing-cushions, all as will be hereinafter fully explained, and specifically pointed out in the claims.

Reference is to be had to the accompanying drawings, forming a part of this specification, in which similar figures of reference indicate corresponding parts in both views.

Figure 1 is a perspective view of my improved music-holder, the holder being represented as it appears when connected with a music-stand; and Fig. 2 is a perspective view of the loop, by means of which the holder is connected to the stand.

In constructing the holder forming the subject-matter of this application I provide two rods or wires 10 and $10^a$, in the ends of which there are formed loops or eyes 11 and $11^a$, the main body of the rod or wire 10 passing through the loop or eye $11^a$, while the main body of the wire or rod $10^a$ passes through the loop or eye 11. The ends of the rods or wires 10 and $10^a$ are bent over at the points 12 and $12^a$, and at the extreme ends of the wires there are formed eyes 13 and $13^a$, in which eyes there are fitted rubber bearing-blocks 14 and $14^a$.

Upon one of the rods or wires 10 or $10^a$ I mount a loop 15, such loop being formed at one end with an open eye 2 and at the other end with an eye $2^a$, through which the main body of the wire passes. By forming the eye 2 open, as represented in Fig. 2, I provide for the disconnection of the eye from the eye or rod in order that the loop 15 may be passed about the central vertical support of a music-stand, such as that shown at 20, the eye 2 being brought into engagement with the wire after the loop has been adjusted about the vertical portion of the music-stand.

After the parts have been arranged as represented in Fig. 1, the rods 10 and $10^a$ may be drawn outward or adjusted inward, so that the rubber blocks or plugs 14 and $14^a$ may be brought to bear in proper position upon the leaves of almost any-sized music book or folio, the rubber plugs bearing firmly upon the leaf and preventing any dragging or displacement thereof.

Having thus described my invention, I claim as new and desire to secure by Letters Patent—

1. In a music-leaf holder, the combination, with a wire formed with an eye, of a second wire which passes through the eye of the first wire and is in turn provided with an eye through which the first wire passes, rubber blocks carried by eyes formed at the ends of the rods or wires, and a means for connecting the holder to a music-stand, substantially as described.

2. In a music-leaf holder, the combination, with a wire 10, formed with an eye 11, of a second wire $10^a$, formed with an eye $11^a$, the wires 10 and $10^a$ passing, respectively, through the eyes $11^a$ and 11, and the wires being bent, respectively, at 12 and $12^a$ and formed with eyes 13 and $13^a$, the rubber blocks 14 and $14^a$, which pass through the eyes 13 and $13^a$, and a loop 15, which engages one of the wires and is arranged to engage a music-stand, substantially as described.

FREDERICK C. WATSON.

Witnesses:
SYDNEY HUTCHINGS,
GEORGE A. WATSON.